United States Patent [11] 3,545,695

[72] Inventor Charles C. Patton
Springfield, Illinois

[21] Appl. No. 755,913
[22] Filed Aug. 28, 1968
[45] Patented Dec. 8, 1970

[73] Assignee Sangamo Electric Company
Springfield, Illinois
a corporation of Delaware

[54] REEL MOUNTING DEVICE
16 Claims, 5 Drawing Figs.

[52] U.S. Cl. 242/68.3
[51] Int. Cl. B65h 17/02
[50] Field of Search 242/68.3, 72, 110.2

[56] References Cited
UNITED STATES PATENTS

| | | | |
|---|---|---|---|
| 410,405 | 9/1889 | Epple | 242/110.2 |
| 2,983,460 | 5/1961 | Wright | 242/68.3 |
| 3,379,388 | 4/1968 | Gruczelak | 242/68.3 |

*Primary Examiner*—Nathan L. Mintz
*Attorney*—Johnson, Dienner, Emrich, Verbeck & Wagner

ABSTRACT: A reel-mounting device including a hub adapted to receive the internal supporting surface of a reel thereover, a pair of radially opposed pivotal bracket members having outer end portions adapted for selective outward extension from the hub, resilient pads mounted on the outer end portions of the bracket members to frictionally engage the internal supporting surface of the reel when mounted on the hub, and a tension spring interconnecting the opposed bracket members and urging them to reel hold-on positions when the reel is mounted on the hub.

PATENTED DEC 8 1970 3,545,695

Inventor:-
Charles C. Patton,
By Brown, Jackson, Boettcher & Dienner
Attys.

REEL MOUNTING DEVICE

BACKGROUND OF THE INVENTION

The present invention relates generally to reel-mounting devices, and more particularly to a reel-mounting device having novel means to releasably retain a reel on a hub, which novel reel-retaining means eliminates the need for a separate locknut or other manually operated reel-locking device.

It is conventional in the tape recorder, motion picture, and computer arts to utilize reels for storing continuous lengths of wire, magnetic tape, film, and the like. The reels are generally adapted to be mounted on a transport mechanism for transferring the wire, tape, or film through an apparatus from one reel to another or from one reel to other types of takeup devices. The prior art devices, in general, provide for securing the reels to reel-mounting hubs through separate locknuts, manually operable clamps, or other cooperating parts which require the operator to manually adjust the locking means when mounting a reel on the hub or releasing the reel from the hub. Many of the prior art reel-mounting devices employ complex linkage mechanisms which contribute to structural failures and thereby to inefficiency and inoperativeness of the apparatus during periods required to repair the reel-mounting devices.

SUMMARY OF THE INVENTION

One of the primary objects of the present invention is to provide a reel-mounting device which overcomes the disadvantages in the prior art reel-mounting devices through the use of novel reel-retaining means operative upon engagement with a reel when mounting the same to releasably retain the reel on a hub.

Another object of the present invention is to provide a reel-mounting device including a hub having a peripheral surface portion adapted to receive a reel thereover and which device includes a pair of radially opposed pivotally supported bracket members having outer end portions extending through corresponding slots in the hub for engagement with the reel when mounted thereon, and which bracket members have means thereon adapted to releasably engage the reel when the brackets are moved to reel-retaining positions as the reel is mounted on the hub.

Another object of the present invention is to provide a reel-mounting device as described including a tension spring operatively associated with the opposed bracket members so as to urge the bracket members to first positions when a reel is removed from the hub, the bracket members and spring being movable to second positions through overcenter movement of the bracket members about their pivotal connections upon engagement of the bracket members with the reel whereupon the spring urges the bracket members to the second positions for releasably retaining the reel on the hub.

A further object of the present invention is to provide a reel-mounting device as described wherein resilient pads are disposed on the outer ends of the support brackets and are operative to frictionally engage and releasably retain the reel only after the reel has been moved onto the hub portion of the device.

Another object of the present invention is to provide a reel-mounting device as described which utilizes a minimum number of components and is highly efficient in operation and economical to manufacture.

Further objects and advantages of my invention, together with the organization and manner of operation thereof may best be understood by reference to the following description of a preferred embodiment of the invention when taken in connection with the accompanying drawing, wherein like reference numerals identify like elements throughout the several views.

PREFERRED DESCRIPTION OF THE DRAWING

DESCRIPTION OF A PREFERRED EMBODIMENT

Figure 1:
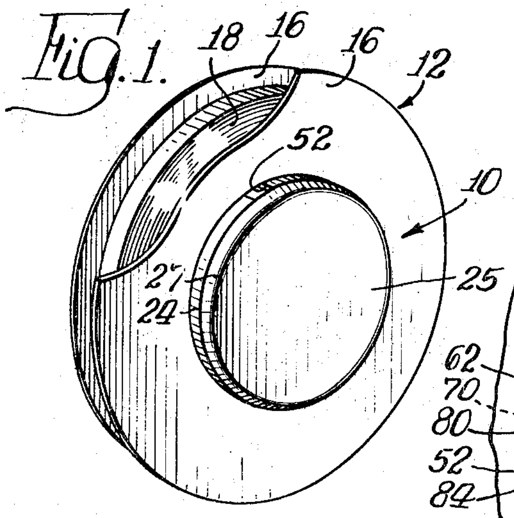
FIG. 1 is a perspective view, partially broken away, illustrating a tape reel mounted on a reel-mounting device constructed in accordance with the present invention.

Referring now to the drawing, FIG. 1 illustrates in perspective a reel-mounting device, indicated generally at 10, constructed in accordance with the present invention having a conventional tape-supporting reel 12 releasably secured or supported thereon. The tape-supporting reel 12 is of a conventional construction and includes a generally annular body 14 having parallel radially extending annular flange portions 16 formed integral therewith. A continuous length of wound magnetic tape, film or wire 18 is supported between the flange portions 16 in a known manner. The annular body 14 of the tape-supporting reel has an internal supporting surface 20 which is illustrated as defining a circular opening through the tape-supporting reel.

The reel-mounting device 10 includes a hub, indicated generally at 22, having a generally cylindrical peripheral surface portion 24 adapted to receive the internal supporting surface 20 of the tape-supporting reel 12 thereover. The cylindrical peripheral surface 24 is preferably formed on a metallic shell which may be stamped or otherwise suitably formed to establish an annular wall formed integral with a planar end surface 25. A radius or chamfered surface 27 is formed between the end surface 25 and the annular wall defining the peripheral surface 24 to assist in guiding the tape-supporting reel 12 onto the hub 22 when mounted thereon. The outer diameter of the peripheral surface portion 24 of hub 22 is slightly less than the internal diameter of the opening defined by the supporting surface 20 of the tape reel to allow the reel to be readily mounted onto and removed from the hub as more fully described hereinbelow.

Figure 4:
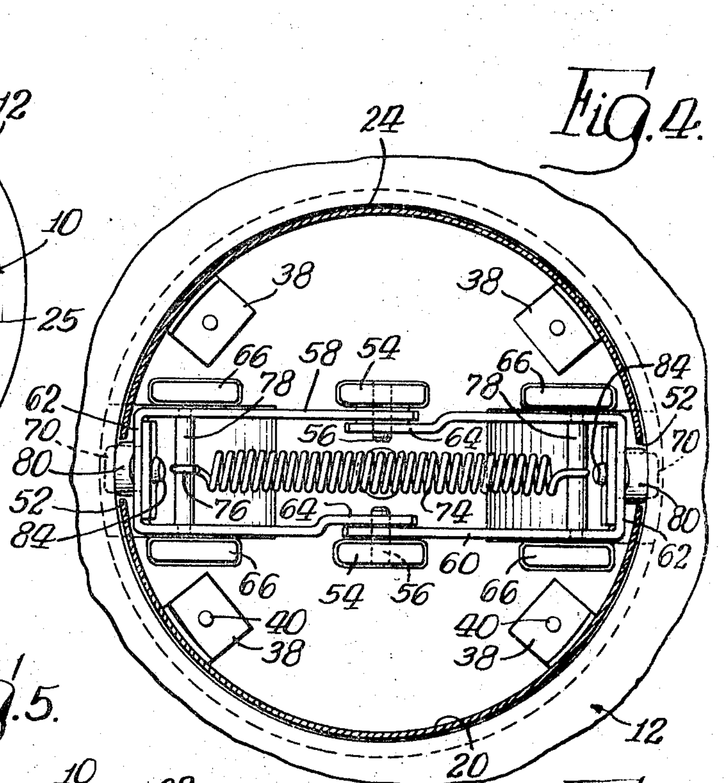
FIG. 4 is a transverse sectional view taken substantially along the line 4—4 of FIG. 3.

While the peripheral surface portion 24 of the hub 22 and the opening through the tape reel 12 defined by the internal supporting surface 20 are illustrated as being circular, when considered in FIG. 4, it will be understood that the opening through the tape-supporting reel may be given any desired planar configuration with the peripheral surface 24 of the hub being given a corresponding configuration to receive the reel thereover. Such alternative irregular-shaped opening in the tape-supporting reel 12 and corresponding irregular-shaped peripheral surface 24 on the hub 22 may be desirable where a positive driving relationship is desired between the hub 22 of the reel-mounting device 10 and the tape reel 12 during driven rotational movement of the hub 22.

The hub 22 includes a support plate 26 having a circular planar flange portion 28. The circular flange 28 has an outer diameter greater than the diameter of the cylindrical peripheral surface portion 24 of the hub such that an annular upper surface 30 extends radially outwardly of the peripheral surface portion 24. The upper surface of the circular flange 28 is stepped at 32 adjacent surface portion 30 to provide a circular locating surface to receive and locate the annular wall defining the peripheral surface 24 of the hub. Noting FIGS. 2 and 4, a plurality of radially inwardly directed plates 38 are affixed to the inner surface of the annular wall defining the peripheral surface 24 of the hub adjacent the lower edge thereof. Preferably, four such plates 38 are provided and are suitably secured to the support plate 26 by screws 40 inserted through the flange portion 28 to retain the shell in fixed assembled relation on the support plate.

The support plate 26 includes means for mounting the hub 22 on a rotatable shaft, which means comprises a boss 42 formed integral with flange 28 and having an axial bore 44 therethrough to receive a shaft 46. The shaft 46 is connected to a suitable driving means for rotation thereof in a conventional manner. A setscrew 48 is threadedly secured to the boss 42 for locking the support plate 26 on the driven shaft 46. In conventional application, the reel-mounting device 10 is supported on the driven shaft 46 adjacent a housing structure, a portion of which is shown at 50, which forms a portion of the apparatus (not shown) with which the reel-mounting device is being used.

Figures 2, 3, 5:
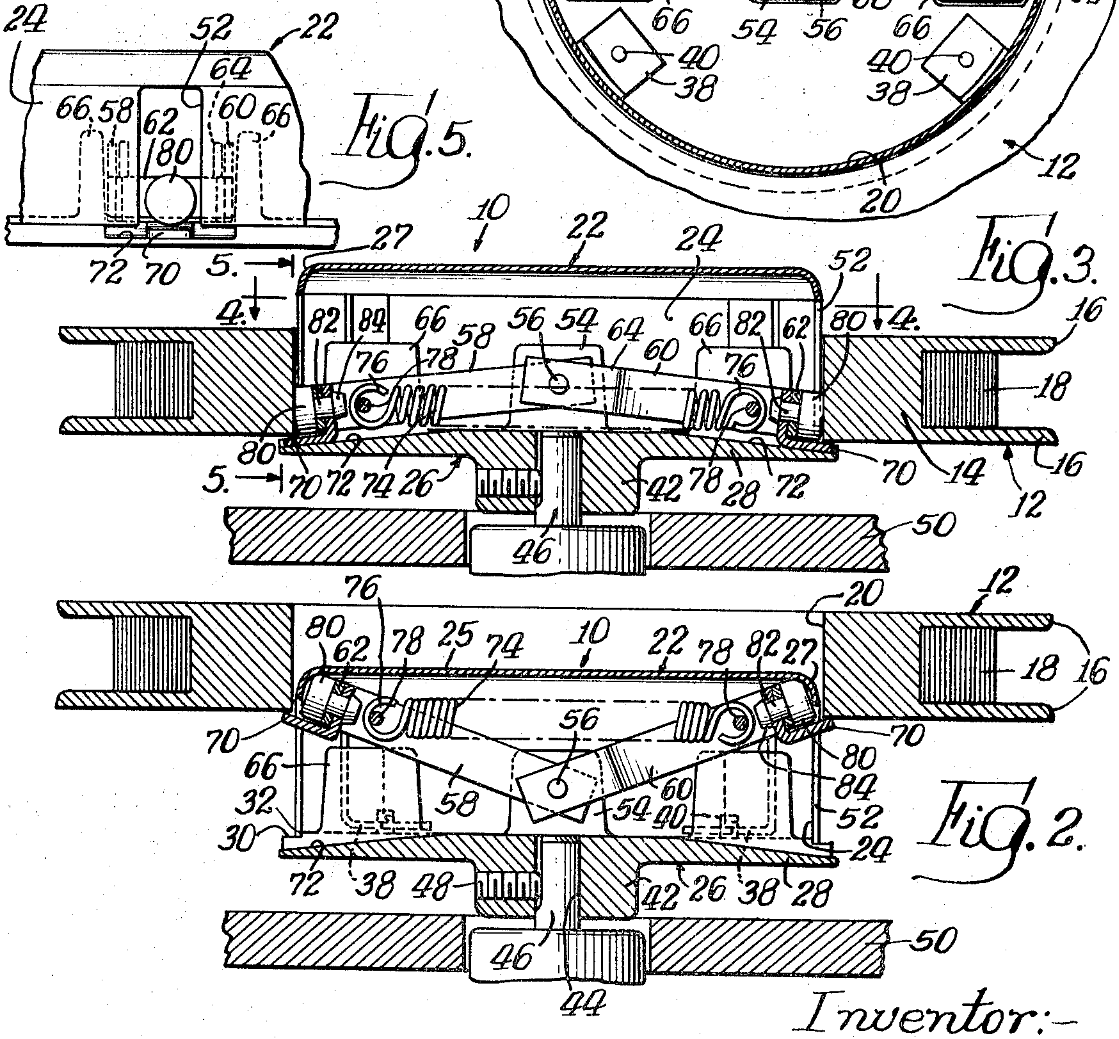
FIG. 2 is a longitudinal sectional view of the tape reel and reel-mounting device of FIG. 1 showing the reel being initially mounted onto the device.
FIG. 3 is a longitudinal sectional view similar to FIG. 2 but illustrating the tape support reel releasably retained on the mounting hub.
FIG. 5 is a partial elevational view taken substantially along the line 5—5 of FIG. 3 looking in the direction of the arrows and with the tape support reel removed from the mounting hub.

Noting FIG. 5, the hub 22 has a plurality of elongated or longitudinally extending slots 52 provided in the annular wall defining the peripheral surface portion 24. The embodiment of the reel-mounting device 10 illustrated in FIGS. 1—5 has two diametrically opposed slots 52 in the peripheral surface portion 24 of the hub 22, with each slot intersecting the lowermost edge of the annular wall-defining surface portion 24 and extending longitudinally of the hub substantially to the radial or chamfered surface portion 27 thereof.

The support plate 26 has a pair of parallel-spaced upstanding support arms 54 formed integral therewith in normal relation to the planar flange portion 28. The upstanding support arms 54 are generally equidistantly spaced from the axis of rotation of the hub 22 and each arm has a radially inwardly directed support pin 56 suitably secured thereto such that the support pins are in axial alignment and parallel to the plane of the planar flange portion 28 of the support plate 26.

A pair of radially opposed bracket members or reel-engaging arms 58 and 60 are pivotally supported by the support plate 26 through pivotal connection to the support pins 56. The bracket members 58 and 60 are generally identical in configuration and each comprises a U-shaped member having an outer end portion 62 and parallel-spaced inwardly directed leg portions having suitable openings therethrough to receive the corresponding support pins 56. One of the inwardly directed legs of each of the bracket members 58 and 60 is formed slightly inwardly as at 64 to allow the opposing bracket members to be supported about the common pivotal axis of the support pins 56. Each of the bracket members 58 and 60 is of a radial length such that outer end portion 62 thereof is disposed slightly inwardly from the annular wall defining the peripheral surface 24 of the hub 22. A pair of parallel-spaced upstanding arm members 66 are formed integral with or otherwise suitably secured to the upper surface of the planar flange portion 28 of the support plate 26 in normal relation thereto generally adjacent the outer end portions of the opposed bracket members 58 and 60 on opposite sides of the parallel leg portions of the brackets. The arm members 66 serve to prevent lateral movement of the corresponding support brackets during pivotal movement thereof about the pivot axis 56. The support pins 56 are spaced upwardly from the upper surface of the planar flange portion 28 of the support plate 26, when considered in FIGS. 2 and 3, such that the bracket members 58 and 60 are pivotable about the pivot axis defined by the support pins 56 between first positions, as shown in FIG. 2, and second positions, as shown in FIG. 3.

Each of the bracket members 58 and 60 has an outer end tab portion 70 opposite the pivotal axis 56, which tab portion extends outwardly of the peripheral surface 24 of hub 22 through a corresponding slot 52 so as to be engaged by a reel 12 when mounting the reel on the hub 22 as will be described more fully below. Each end tab portion 70 comprises a generally L-shaped member having one leg portion suitably secured to the outer end portion 62 of the corresponding bracket member 58 or 60 with the tab being supported generally intermediate the inwardly directed leg portions of the U-shaped bracket member. Alternatively, each tab portion 70 may be formed integral with its corresponding bracket member.

A pair of diametrically opposed radially directed slots 72 are provided in the upper surface of the planar flange portion 28 of the support plate 26, which slots are angularly inclined relative to the plane of the flange portion 28. The slots 72 are of a width, when considered in plan, to readily accommodate the outer end tabs 70 on the bracket members 58 and 60 when the bracket members are in their second pivotal positions as illustrated in FIG. 3. The slots 72 provide abutment means for the end tabs 70 and thereby establish the extent of allowable pivotal movement of the bracket members 58 and 60 in a downward pivotal direction toward the support plate 26.

A tension spring means 74 is operatively associated with the radially opposed bracket members 58 and 60 in a manner to form an overcenter mechanism in cooperation with the pivotally connected bracket members during pivotal movement thereof about their pivot axis 56. The tension spring means 74 comprises a conventional tension spring having hook-shaped end portions 76 which are suitably secured to cross pins 78 affixed to and between the inwardly directed spaced leg portions of the bracket members 58 and 60. The cross pins 78 may be secured between the leg portions of the support brackets in any suitable manner and are disposed generally adjacent the outer end portions 62 thereof. Noting FIGS. 2 and 3, when the bracket members 58 and 60 are disposed in their first positions with the reel 12 removed from the hub 22, the tension spring means 74 urges the the bracket members upwardly away from support plate 26 about the pivot axis 56 to such first positions.

With the end tabs 70 on the outer end portions 62 of the bracket members 58 and 60 extending outwardly of the peripheral surface 24 of the hub 22, mounting a reel 12 onto the hub 22 causes the reel to engage the extending tabs 70 whereby to pivot the corresponding bracket members 58 and 60 downwardly about their pivotal axis 56. When the bracket members are moved downwardly by the reel 12 such that the cross pins 78 are disposed below a plane intersecting the pivot axis 56 and parallel to the plane of flange portion 28 of the support plate 26, the tension spring 74 will establish overcenter action of the opposed bracket members to urge them to their second positions as illustrated in FIG. 3.

Means are provided on the outer end portion 62 of each of the bracket members 58 and 60 to frictionally engage the peripheral supporting 20 of a reel 12 and retain the reel on the hub 22 when mounted on the reel-mounting device 10. Such means comprises a resilient pad 80 supported by the outer end portion 62 of each of the bracket members 58 and 60 intermediate the inwardly directed leg portions thereof. The resilient pads 80 provide the coupling driving force between the hub and the reel during rotational movement of the hub and are preferably made of rubber or a similar material. Each pad 80 includes an axial stem portion 82 which extends through and is supported by an appropriate aperture through the end portion 62 of the corresponding bracket member and the associated end tab 70. The inward or rearward end of each stem portion 82 is enlarged at 84 in a known manner to prevent accidental withdrawal of the corresponding resilient pad. Each of the resilient pads 80 has an axial length, when considered outwardly from the outer surface of the corresponding portion 62 of the associated bracket member 58 or 60, such that the resilient pads extend outwardly from the peripheral surface portion 24 of the hub 22 through the slots 52 when the bracket members are in their downward pivotal positions as illustrated in FIG. 3, the axial lengths being such that the pads are disposed within the annular wall of the hub 22 inwardly from the slots when the support brackets are in their upward or first pivotal positions as illustrated in FIG. 2.

Noting FIG. 2, it can be seen that with the resilient pads 80 supported on the outer end portions 62 of the bracket members 58 and 60 and having axial lengths as above described, the resilient pads will abut the under surface of the end 25 of the hub 22 when the bracket members are in their upward pivotal positions. The hub 22 therefore serves to establish the upward pivotal or first positions of the bracket members 58 and 60 when a reel 12 is removed from the reel-mounting device 10.

Having thus described the elements comprising the reel-mounting device 10, its operation will now be briefly described. As noted above, the bracket members 58 and 60 are normally urged to the first pivotal positions illustrated in FIG. 2 by the tension spring 74 when a reel is not mounted on the reel-mounting device. When mounting a reel on the hub 22 of the reel-mounting device, the surface of the reel adjacent the outwardly extending tab portions 70 on the bracket members will engage the tabs to effect pivotal movement of the bracket members in a direction toward the support plate 26. During initial mounting of the reel, the resilient pads 80 are disposed inwardly of the cylindrical peripheral surface 24 of the hub and do not engage the internal supporting surface 20 of the reel. As the bracket members 58 and 60 are pivoted toward the support plate 26 by the reel 12, the tension spring 74 and associated cross pins 78 pass below the axis of the support pins 56. At this point, the resilient pads 80 extend outwardly of the peripheral surface 24 of the hub through the corresponding slots 52 to frictionally engage the supporting surface 20 of the reel. As the tension spring 74 and associated cross pins 78 pass below the pivotal axis of pins 56, the tension spring urges the bracket members 58 and 60 toward the support plate 26 through the overcenter action such that the tab portions 70 on the bracket members abut the inclined slots 72 in the flange portion 28 of the support plate. The side surface of the reel adjacent the supporting surface 20 thereof is thereby urged against the annular surface 30 on the support plate 26 by the resilient pads 80 to firmly retain the reel on the hub 22 with the friction pads further providing a driving coupling relation between the hub and the reel. Subsequent rotary movement of the hub 22 through the drive shaft 46 establishes a corresponding rotary movement of the reel 12.

In removing a reel from the reel-mounting device 10, the operator merely grasps the reel and pulls it axially outwardly from the support plate 26. As the reel is pulled away from the support plate 26, it effects outward pivotal movement of the bracket members 58 and 60 away from the support plate through the frictional engagement with the resilient pads 80. As the reel 12 is removed from the hub 22, the bracket members 58 and 60 are pivoted to positions wherein the tension spring 74 and associated cross pins 78 pass above the pivotal axis 56 whereupon the tension spring effects overcenter movement of the bracket members and urges them upwardly until the resilient pads 80 engage the undersurface of the end 25 of the hub. As noted, when the bracket members 58 and 60 are pivoted to the pivotal positions shown in FIG. 2, the resilient pads 80 are withdrawn from contact with the internal supporting surface 20 of the reel thereby allowing the reel to be freely removed from the hub and leaving the bracket members 58 and 60 in their upward pivotal positions preparatory to subsequent mounting of another reel thereon.

While a preferred embodiment of my invention has been shown and described, it will be obvious to those skilled in the art that changes and modifications may be made therein without departing from the invention in its broader aspects.

I claim:

1. A reel-mounting device for supporting a reel having an internal supporting surface defining an opening in the reel, said mounting device comprising a hub having a peripheral surface portion adapted to receive the internal supporting surface of the reel thereover, said hub including a support plate and having a plurality of slots in said peripheral surface portion, a plurality of bracket members each corresponding to one of said slots, said bracket members being pivotally supported by said support plate to establish at least one pair of radially opposed bracket members, each of said bracket members having an outer end portion opposite its pivotal connection extending outwardly of said peripheral surface through a corresponding slot and adapted to be engaged by the reel when received over said hub, said bracket members being urged to first positions when the reel is removed from the hub and being movable to second positions by engagement with the reel when received over said hub, means on the outer end portion of each of said bracket members to frictionally engage the internal peripheral supporting surface of the reel when said bracket members are moved to said said second positions by the reel so as to retain the reel on said hub, and means operatively associated with each pair of opposed bracket members to urge said bracket members to said first positions when the reel is removed from said hub and to establish over-center action of said pairs of opposing bracket members about their pivotal connections when moved from said first to said second positions by said reel to urge said bracket members toward said second positions.

2. A reel-mounting device as defined in claim 1 wherein the radially opposed bracket members of each pair of bracket members are supported for pivotal movement about a common pivotal axis.

3. A reel-mounting device as defined in claim 1 wherein said means operatively associated with each pair of opposed bracket members to urge said bracket members to said first positions comprises a tension spring having end portions connected to each of the radially opposed bracket members, said end portions of said tension spring being connected to said bracket members generally adjacent the outer ends thereof.

4. A reel-mounting device as defined in claim 1 wherein said support plate lies in a plane transverse to the longitudinal axis of said hub, and wherein said bracket members are supported for pivotal movement in planes normal to the plane of said support plate.

5. A reel-mounting device as defined in claim 1 wherein said peripheral surface portion of said hub comprises a cylindrical surface.

6. A reel-mounting device as defined in claim 1 wherein said means on the outer end portion of each of said bracket members to frictionally engage the internal supporting surface of the reel comprises a resilient pad.

7. A reel-mounting device as defined in claim 1 wherein said hub has two generally longitudinally extending slots in said peripheral surface portion, and wherein said plurality of bracket members comprises two pivotally supported radially opposed bracket members each disposed in radial alignment with a corresponding slot.

8. A reel-mounting device as defined in claim 7 wherein said hub is adapted to establish said first and second positions of said bracket members.

9. A reel-mounting device as defined in claim 7 wherein said support plate includes means for mounting said hub on a rotatable shaft.

10. A reel-mounting device as defined in claim 7 wherein said radially opposed bracket members are supported for pivotal movement about a common pivotal axis.

11. A reel-mounting device as defined in claim 7 wherein each of said bracket members has a radial length considered from its pivotal axis such that said means on the outer end portion of each of said bracket members to frictionally engage the internal supporting surface of the reel does not project outwardly of said peripheral surface of said hub when said bracket members are in said first positions, said radial length being such that said reel-engaging friction means projects outwardly of said peripheral surface when said bracket members are moved to said second positions.

12. A reel-mounting device as defined in claim 11 wherein said means operatively associated with said radially opposed bracket members to urge said bracket members to said first positions comprises a tension spring having end portions connected to each of said radially opposed bracket members generally adjacent the outer end portions thereof.

13. A reel-mounting device for supporting a reel having an internal supporting surface defining an opening in the reel, said mounting device comprising a hub having a peripheral surface portion adapted to receive the internal supporting surface of the reel thereover, said hub including a support plate and having a plurality of slots in said peripheral surface portion, a plurality of bracket members each corresponding to one of said slots and pivotally supported by said support plate, each of said bracket members having an outer end portion extending outwardly of said peripheral surface through a corresponding slot and adapted to be engaged by a reel received over said hub, said bracket members being movable between first positions when a reel is removed from said hub and second positions when a reel is mounted on said hub, friction pad means supported on the outer end portion of each of said bracket members and adapted to engage the internal peripheral supporting surface of a reel mounted on said hub with said bracket members in said second positions, said friction pad means establishing substantially radial forces against the internal supporting surface of the reel with said bracket members in said second positions.

14. A reel-mounting device as defined in claim 13 wherein said friction pad means are adapted for nonengagement with a reel when said bracket members are in their first positions, said friction pad means being adapted to engage the internal supporting surface of a reel when received over said hub to move said bracket members to their said second positions.

15. A reel-mounting device as defined in claim 13 wherein said support plate includes an annular surface adapted to be engaged by a side surface of a reel disposed normal to the axis of the opening in the reel, and wherein said friction pad means are adapted to urge the reel side surface against said support plate annular surface when said bracket members are disposed in their said second positions.

16. A reel-mounting device as defined in claim 15 wherein said friction pad means comprise resilient pads adapted to be compressed upon mounting of a reel on said hub, the resulting compression reaction forces establishing said substantially radial forces against the internal peripheral surface of the reel mounted on said hub.